Jan. 26, 1937.　　　　　B. S. PENLEY　　　　　2,068,761
PROCESS AND APPARATUS FOR PRODUCING VARIEGATED ROOFING
Filed Aug. 26, 1933
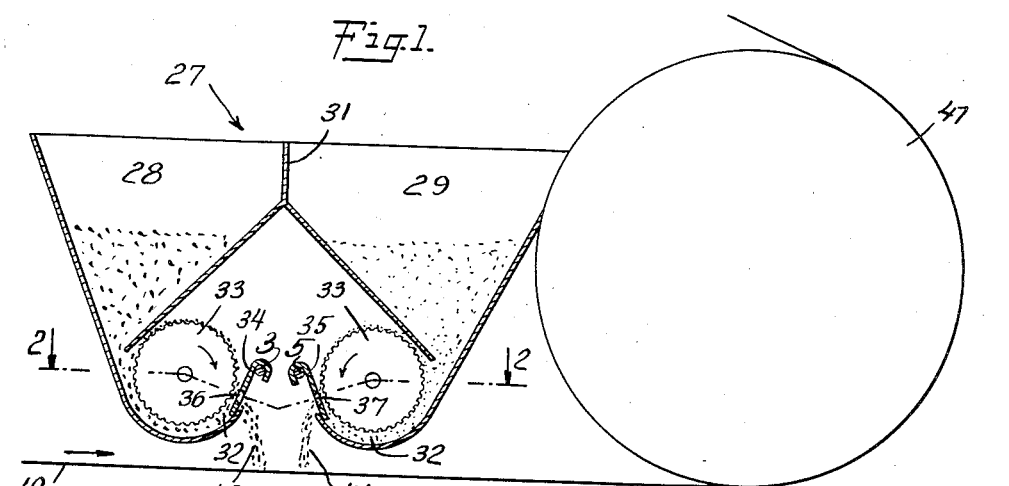
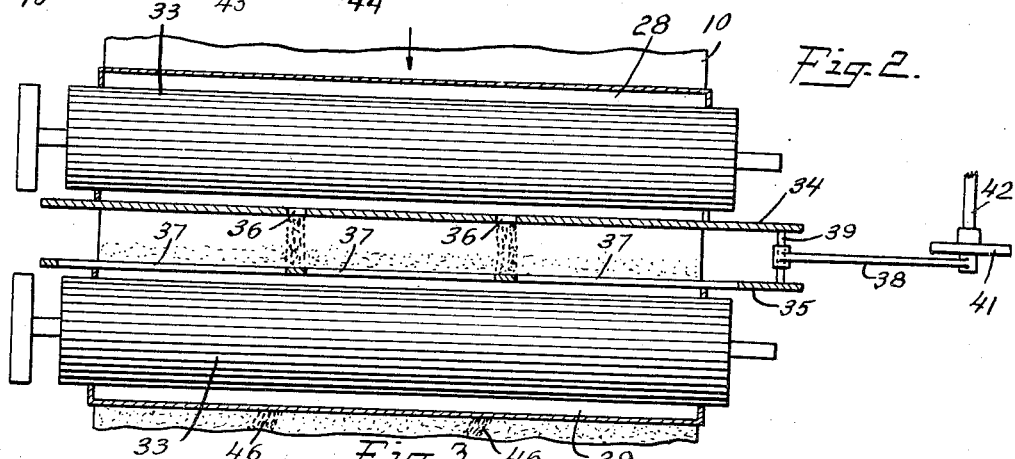
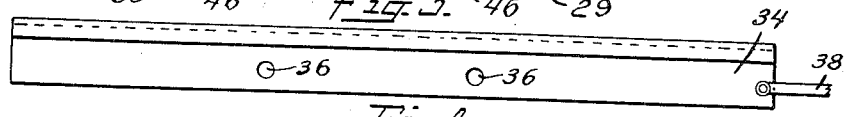
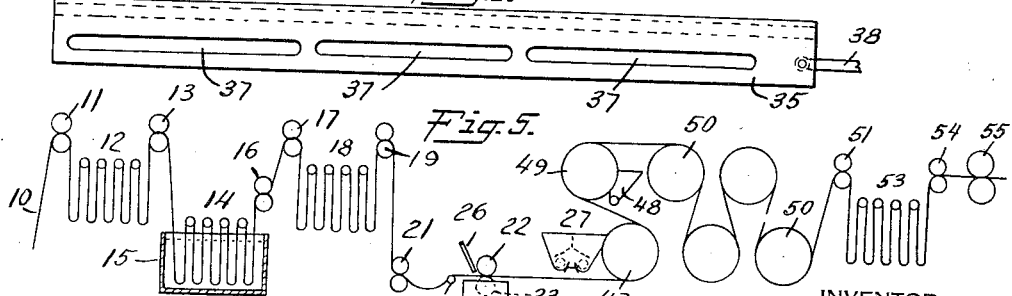
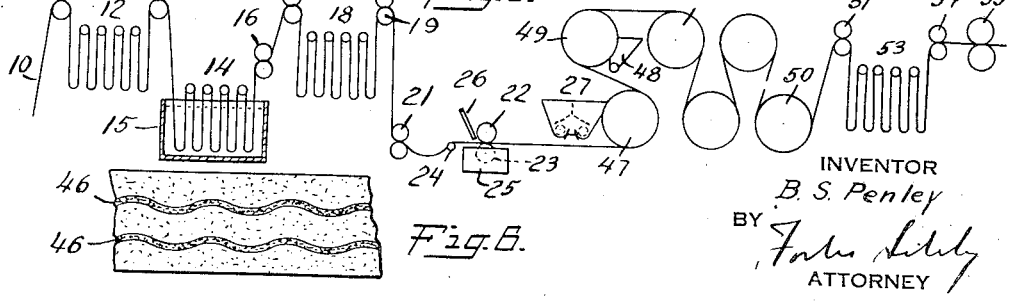
INVENTOR
B. S. Penley
BY
ATTORNEY Patented Jan. 26, 1937

2,068,761

UNITED STATES PATENT OFFICE 2,068,761

PROCESS AND APPARATUS FOR PRODUCING VARIEGATED ROOFING

Benjamin S. Penley, Yeadon, Pa., assignor to The Barrett Company, New York, N. Y., a corporation of New Jersey Application August 26, 1933, Serial No. 686,914

5 Claims. (Cl. 91—43)

This invention relates to roofing, and more particularly, to the surfacing of roofing with differently colored granular material to produce roofing presenting a variegated appearance. The term "roofing" is used herein in a broad sense and is intended to include not only the usual felt base composition roofing, whether employed for covering roofs, walls, or other surfaces, but also other covering material, such as that made from a mastic or adhesive composition and adapted to be surfaced with granular material.

It has been proposed to surface roofing by applying contiguous longitudinal parallel stripes or bands of differently colored granular material to a roofing sheet. To create wavy stripes on the roofing sheet, the hopper from which the granular material was fed onto the sheet was reciprocated transversely of the direction of movement of the sheet. To get away from the monotonous regularity of such striped sheets, it has been suggested that granular material be applied in two steps, the granular material applied during the first step covering selected areas and granules of a contrasting color applied during the second step covering the entire sheet including the portions of the sheet covered in the first step. Such procedure, it will be appreciated, involves the excessive handling and waste of granular material. Furthermore, considerable excess of granular material of different colors is applied. This must be removed from the sheet and recovered. It is difficult and requires a complicated mechanical layout to recover such excess granules without mixing the colors and the resultant irregular blend is of diminished value for surfacing.

It has also been proposed to simultaneously apply to a roofing sheet two streams of granular material, each stream of a width sufficient to completely cover the sheet. One stream was fed from a hopper having partitions dividing it into compartments containing differently colored granular material so that a striped effect was produced. The other stream was fed from a hopper containing a solid color of granular material which blended with and masked to some extent the color of the stripes produced by the granular material fed from the first-mentioned hopper. Such procedure also involves excessive handling and waste of granular material.

It is an object of this invenion to provide a one-step surfacing procedure for the production of variegated roofing, which procedure, particularly as compared with heretofore existing surfacing processes, reduces the handling of the granular material to a minimum. In accordance with the surfacing procedure of my invention, a plurality of sets of spaced wavy streams of granular material are simultaneously fed onto the continuously moving coated roofing web. The sets of streams are in different planes with the individual streams of one set staggered with respect to those of another set and the aggregate width of the streams such as to completely cover the entire width of the coated roofing web. The grit of one set of streams is preferably of contrasting color or degree of coarseness or other physical characteristics as compared with the grit of the other set of streams. Hence, the application of these streams to the roofing sheet results in the production of variegated roofing of pleasing appearance.

Another object of this invention is to provide apparatus of comparatively simple design and efficient in operation for practicing such procedure. Other objects and advantages of this invention will be apparent from the following detailed description taken in connection with the accompanying drawing, in which—

Fig. 1 is a vertical section, partly in elevation, through surfacing apparatus embodying this invention;

Fig. 2 is a horizontal section, partly in elevation, taken in a plane passing through line 2—2 of Fig. 1;

Fig. 3 is a plan view of the valve plate for controlling the discharge of granular material from one hopper;

Fig. 4 is a plan view of the valve plate for controlling the discharge of granular material from the other hopper;

Fig. 5 is a side elevation, somewhat diagrammatic in character, showing equipment for making composition roofing; and Fig. 6 is a fragmentary plan view of roofing surfaced in accordance with this invention.

Referring to the drawing, with particular reference to Fig. 5, a sheet of fibrous material 10, which may be and preferably is of the usual roofing felt made of rag fiber, paper stock, or other fibrous material, with or without suitable fillers, as well known in the roofing art, is fed by feed rolls 11 from the usual paper making machine or felt roll into a looping device 12. From this looping device, rolls 13 feed the sheet into any suitable type of saturating apparatus indicated generally by the reference numeral 14. Saturating tank 15 may contain suitable cementitious waterproofing composition, such as asphalt or other bituminous material, utilized for the impregnation and saturation of roofing felts.

Feed rolls 16 and 17 feed the saturated sheet to a second looping device 18. The passage of the saturated fibrous sheet or base through the looping device 18 gives the saturant an opportunity to impregnate the base thoroughly and to dry. Feed rolls 19 and 21 feed the saturated sheet from the looping device 18 to the coating apparatus involving a pair of coating rolls 22, 23. Feed rolls 21 are preferably driven at a slightly greater peripheral speed than the coating rolls 22, 23, slack accumulating between the driven rolls 21 and the guide roll 24, over which the sheet passes before passing over the coating roll 23. Coating roll 23 is rotatably mounted in a tank 25 which may contain bituminous material, such as asphalt or other cementitious waterproofing substance suitable for coating roofing felt. Bituminous material, such as asphalt, may be applied to the top of the sheet by means of a pipe 26 having a spout of a width approximately equal to that of the sheet. As the sheet passes between the coating rolls 22, 23, the underside is completely coated by roll 23. The coating material delivered by pipe 26 is spread uniformly over the top side of the sheet by the coating roll 22, excess coating material passing over the edges of the sheet and draining into the tank 25.

Immediately after leaving the coating rolls 22, 23 and while the coating material is still hot, soft and tacky, the coated sheet passes under the surfacing apparatus indicated generally by the reference numeral 27. In the embodiment of the invention shown in Fig. 1, the surfacing apparatus comprises two hoppers 28, 29, arranged one in back of the other and each extending across the full width of the roofing sheet 10. As shown in Fig. 1, the hoppers are disposed contiguous to each other and might be regarded as one hopper divided by a partition 31 into two compartments. If desired, the hoppers 28, 29 may be spaced apart. Rotatably mounted in the discharge outlet 32 of each hopper is a fluted distributor roll 33. The rolls 33 may be driven from any suitable source of power, such as an electric motor (not shown). Preferably, however, the rolls 33 are geared to the drive for the rolls or drums 49 or 50, which pull the sheet through the apparatus so that the speed of rotation of rolls 33, and consequently the velocity of the grit discharged from the grit-containing hoppers, is proportional to the sheet speed. By gearing the drive for the grit-distributing rolls to the drive for feeding the sheet through the apparatus, the grit-distributing rolls are driven only when the sheet is moved through the apparatus.

As shown in Figs. 1 and 2, a valve plate 34 has the upper end slidably suspended from a fixed rod 3 and functions to control the discharge of granular material from hopper 28. A second valve plate 35 has its upper end slidably suspended from a second fixed rod 5 and functions to control the discharge of granular material from hopper 29. Valve plate 34 is formed with relatively small openings 36 (Fig. 3), and the other valve plate with long narrow openings in the form of slots 37. Openings 36 are disposed in the valve plate 34 opposite the closed portions between the openings 37 in the other valve plate 35, as appears in Figs. 2, 3, and 4. The valve plates 34, 35 may be reciprocated transversely to the direction of movement of sheet 10 by a suitable mechanism, as for example by a link 38 having one end secured to both plates, as at 39, and having the other end pivoted to a disc or crank 41 keyed to shaft 42 arranged to be rotated from any suitable source of power. As is apparent, rotation of the shaft 42 through the crank 41 and link 38 causes simultaneous reciprocation of the valve plates 34, 35.

In operation, grit, such as crushed slate, rock, or other mineral granules of different colors, coarseness or other characteristics are supplied to the hoppers 28, 29. The grit is showered by the rotating distributor rolls 33 through the openings 36, 37 in the valve plates 34, 35, respectively. Two sets of spaced streams of like wavy contour of granular material are thus formed, the wavy contour of the streams being due to the reciprocation of valve plates, as hereinabove described, which preferably occurs continuously during the operation of the surfacing apparatus. The streams of one set, indicated by the reference numeral 43, Fig. 1, travel in a substantially vertical plane from the hopper 28 onto the coated sheet 10 while the streams of the other set, indicated by the reference numeral 44, travel in a second substantially parallel vertical plane from the hopper 29 onto the coated sheet. The individual streams flowing through openings 36, it will be noted, are staggered with respect to the streams flowing through openings 37 and the aggregate width of all the streams is at least equal to, and preferably somewhat greater than, the width of the roofing sheet onto which the streams flow. As the valve plates are reciprocated, both sets of streams are moved horizontally within their planes of flow onto the roofing sheet, the side edges of the streams of one set overlapping slightly the side edges of the streams of the other set. Thus, as the coated sheet passes beneath the surfacing apparatus, wavy bands 46 (Fig. 6) are formed, the marginal portions of which are constituted of the blend of granules produced by the mixing of the differently colored granules from hoppers 28, 29, and the color of bands 46 contrasting in color with that of the remaining portion of the roofing.

After being surfaced, as hereinabove described, the surfaced sheet passes about reversing roll 47, which functions to partially embed the mineral granules in the plastic coating. Any excess granules fall from the surfaced sheet into the hopper 29. If it is desired to apply a solid color of granules to the sheet from hopper 29 and not a blend of granules, a separate hopper may be provided above hopper 29 for receiving the excess granules falling off from the surfaced sheet.

In the continued passage of the surfaced sheet, it travels next under a hopper 48. Powdered talc, mica, or other anti-stick composition capable of rendering the back of the sheet non-cementitious is disposed in hopper 48 and is discharged therefrom onto the coating on the back of the sheet in the form of a talc surfacing layer covering substantially the entire width of the sheet. The talc covered sheet then passes over reversing roll 49 which partially embeds the talc in the sealback coating and imparts a smooth surface to the back of the sheet. Excess talc falls from the sheet as it passes from reversing roll 49 to the first of a series of calender rolls each identified by the reference character 50. From the calender rolls 50, the sheet may be fed by feed rolls 51 through looping device 53 where the coated and surfaced product is given an opportunity to cool. Feed rolls 54 may feed the surfaced sheet into a winding machine where it may be wound into rolls which are shipped or used as the desired roll roofing product or these feed rolls may feed the surfaced sheet into cutting cylinders 55 for cutting the sheet into individual or strip shingles.

Since certain changes in carrying out the above process and certain modifications of the apparatus may be made without departing from the scope of this invention, it is intended that all matter contained in the above description or shown in the accompanying drawing shall be interpreted as illustrative and not in a limiting sense.

I claim:

1. The process of surfacing roofing which comprises simultaneously feeding a plurality of spaced wavy streams of granular material from a plurality of sources thereof in substantially vertical planes onto a moving roofing sheet, the streams of each set being spaced from each other in a direction widthwise of the sheet and the sets of streams being spaced from each other in a direction generally longitudinally of the sheet, causing the streams of each set to flow in a sinuous path within its substantially vertical plane of flow and maintaining the streams of one set in staggered relation with respect to the streams of another set, the streams of one set overlapping the streams of the other set to insure complete coverage of the roofing sheet with granular material the granular material of one set being of different characteristics from that of another set and both sets of streams being fed onto the moving sheet at a velocity proportional to the movement of the sheet.

2. Surfacing apparatus comprising in combination, a plurality of sources of granular surfacing material of different appearance, means for feeding a roofing sheet, means for feeding a set of spaced streams of granular material from said source directly onto said sheet, the streams of said set being in a substantially vertical plane lying widthwise of the sheet, means for feeding a second set of spaced streams of granular material onto said sheet, the streams of said second set being in another substantially vertical plane lying widthwise of said sheet, the planes of the two sets of streams being spaced from each other in a direction generally longitudinally of the sheet, the streams of one set alternating with and overlapping the edges of the streams of another set, and means for moving said streams horizontally within their planes of flow.

3. Surfacing apparatus comprising means for feeding a roofing sheet, a plurality of compartments spaced one in back of the other, a distributing roll in each compartment arranged to discharge granular material therefrom, a valve plate controlling discharge of granular material from each compartment, said valve plates being provided with openings arranged so that the granular material is discharged therefrom in a plurality of sets of spaced streams which are in staggered relation to each other, the streams of one set being spaced from the streams of another set in a direction generally longitudinally of the roofing sheet and means for simultaneously reciprocating said valve plates.

4. Surfacing apparatus comprising means for feeding a roofing sheet, two hoppers a distributing roll for discharging granular material from each hopper, a valve plate disposed to control the discharge of granular material from each hopper, each of said valve plates having openings therein, said valve plates and distributing rolls being constructed and arranged to discharge two sets of streams of granular material from said hoppers directly onto said sheet, said sets of streams being spaced from each other in a direction longitudinally of the sheet, the openings in one valve plate being arranged in staggered relation with respect to those in the other plate and means for reciprocating said valve plates to cause flow of two sets of wavy streams onto said roofing sheet, the streams of one set being staggered with respect to the streams of the other set.

5. Surfacing apparatus comprising means for feeding a roofing sheet, two hoppers each extending across the width of the roofing sheet passing therebeneath, a distributing roll in each hopper, a valve plate extending into each hopper to control the discharge of granular material therefrom, each of said valve plates having openings therein, said distributing rolls and valve plates being constructed and arranged to feed the granular material from said hopper onto said roofing sheet in two sets of streams, the sets of streams being spaced from each other longitudinally of the sheet, the openings in one valve plate being arranged in staggered relation with respect to those in the other valve plate and means for reciprocating said valve plates transversely of the movement of the roofing sheet passing beneath said hoppers.

BENJAMIN S. PENLEY.